(12) United States Patent
Durbec et al.

(10) Patent No.: US 8,925,378 B2
(45) Date of Patent: Jan. 6, 2015

(54) MODULAR APPARATUS AND METHOD FOR MAKING MEASUREMENTS IN BOREHOLES

(75) Inventors: Charles Durbec, Epone (FR); Olivier Faivre, Paris (FR); Patrick Vessereau, Hericy (FR); Andrew Hayman, Voisins-le-Bretonneux (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 886 days.

(21) Appl. No.: 13/121,231

(22) PCT Filed: Sep. 23, 2009
(Under 37 CFR 1.47)

(86) PCT No.: PCT/EP2009/006935
§ 371 (c)(1),
(2), (4) Date: Feb. 16, 2012

(87) PCT Pub. No.: WO2010/037507
PCT Pub. Date: Apr. 8, 2010

(65) Prior Publication Data
US 2012/0247198 A1    Oct. 4, 2012

(30) Foreign Application Priority Data

Sep. 30, 2008 (EP) .................................. 08165544

(51) Int. Cl.
| | | |
|---|---|---|
| *E21B 49/00* | (2006.01) | |
| *E21B 47/00* | (2012.01) | |
| *G01V 11/00* | (2006.01) | |
| *G01V 1/40* | (2006.01) | |

(52) U.S. Cl.
CPC . *G01V 1/40* (2013.01); *E21B 47/00* (2013.01); *G01V 11/00* (2013.01)
USPC ............................................ 73/152.02; 702/11

(58) Field of Classification Search
CPC ........... G01V 9/00; G01V 11/00; E21B 47/00
USPC ........................................ 73/152.02, 152.16
See application file for complete search history.

(56) References Cited

U.S. PATENT DOCUMENTS

| | | | |
|---|---|---|---|
| 4,567,759 A | | 2/1986 | Ekstrom et al. |
| 4,641,724 A | * | 2/1987 | Chow et al. ................... 181/104 |
| 5,022,484 A | | 6/1991 | Panetta |
| 6,191,588 B1 | | 2/2001 | Chen |
| 7,066,282 B2 | | 6/2006 | Chen et al. |
| 2004/0251048 A1 | | 12/2004 | Kurkoski |
| 2006/0220649 A1 | | 10/2006 | Martinez et al. |
| 2008/0078241 A1 | | 4/2008 | Tchakarov |

FOREIGN PATENT DOCUMENTS

| | | |
|---|---|---|
| EP | 0487425 | 5/1992 |
| GB | 2424665 | 10/2006 |

* cited by examiner

*Primary Examiner* — Hezron E Williams
*Assistant Examiner* — Rodney T Frank
(74) *Attorney, Agent, or Firm* — Stephanie Chi; Jody DeStefanis

(57) ABSTRACT

Apparatus for making measurements in boreholes comprising a sonde having a radial array of arms provided thereon; wherein the sonde is connectable to a cartridge containing electronic circuitry specific to a predetermined measurement to be made in the borehole, each arm is connectable to a sensor pad specific to the predetermined measurement; and the sonde provides electrical connectivity between the sensor pads and the cartridge that is substantially independent of the predetermined measurement.

20 Claims, 5 Drawing Sheets

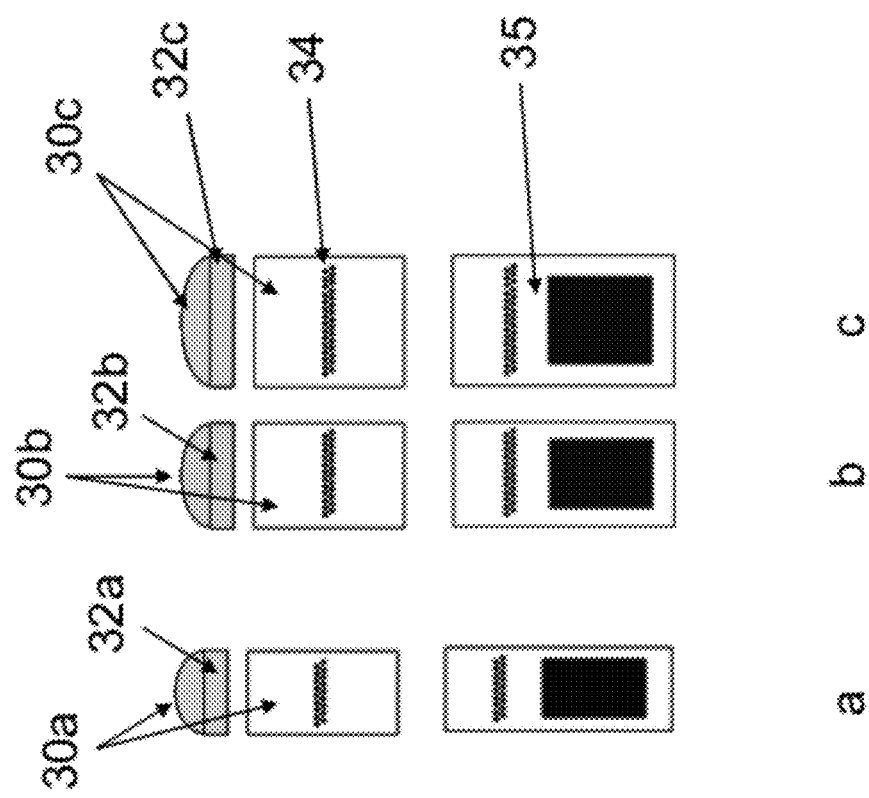

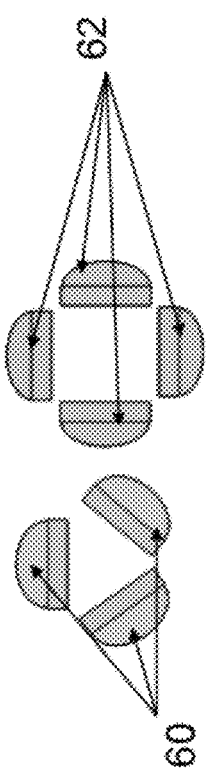
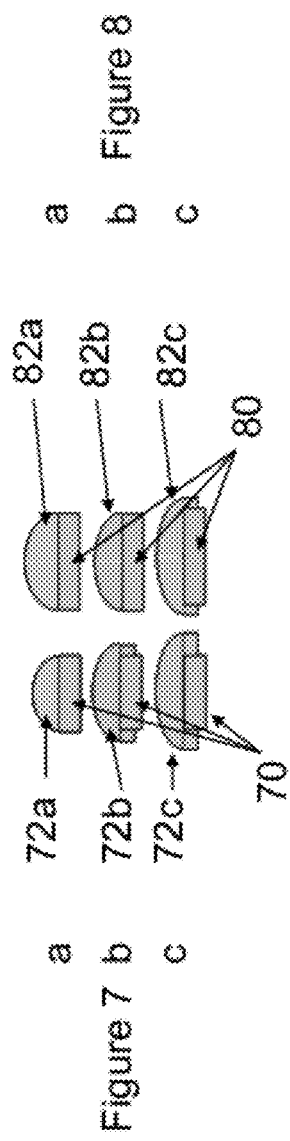
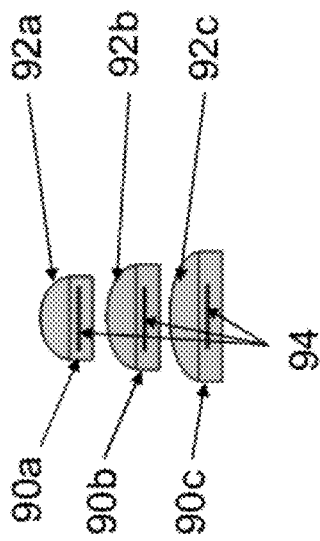
Figure 6
Figure 7
Figure 8
Figure 9

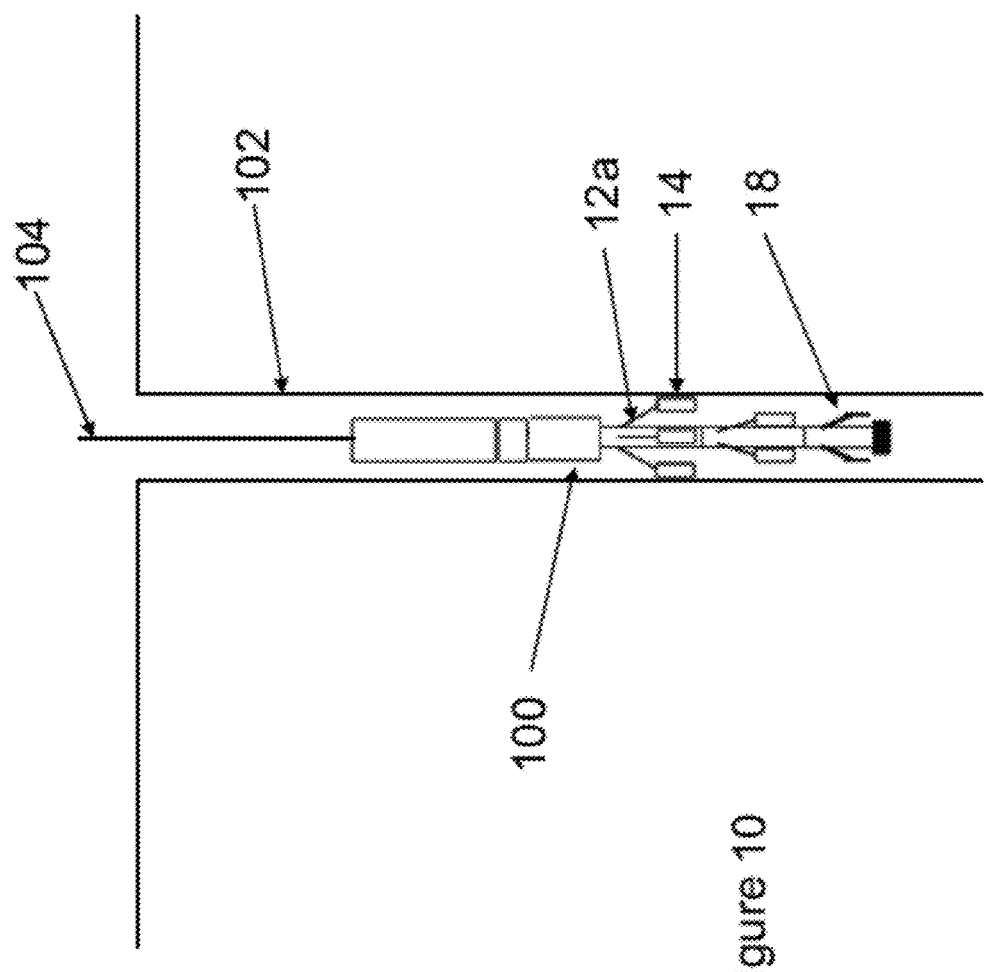

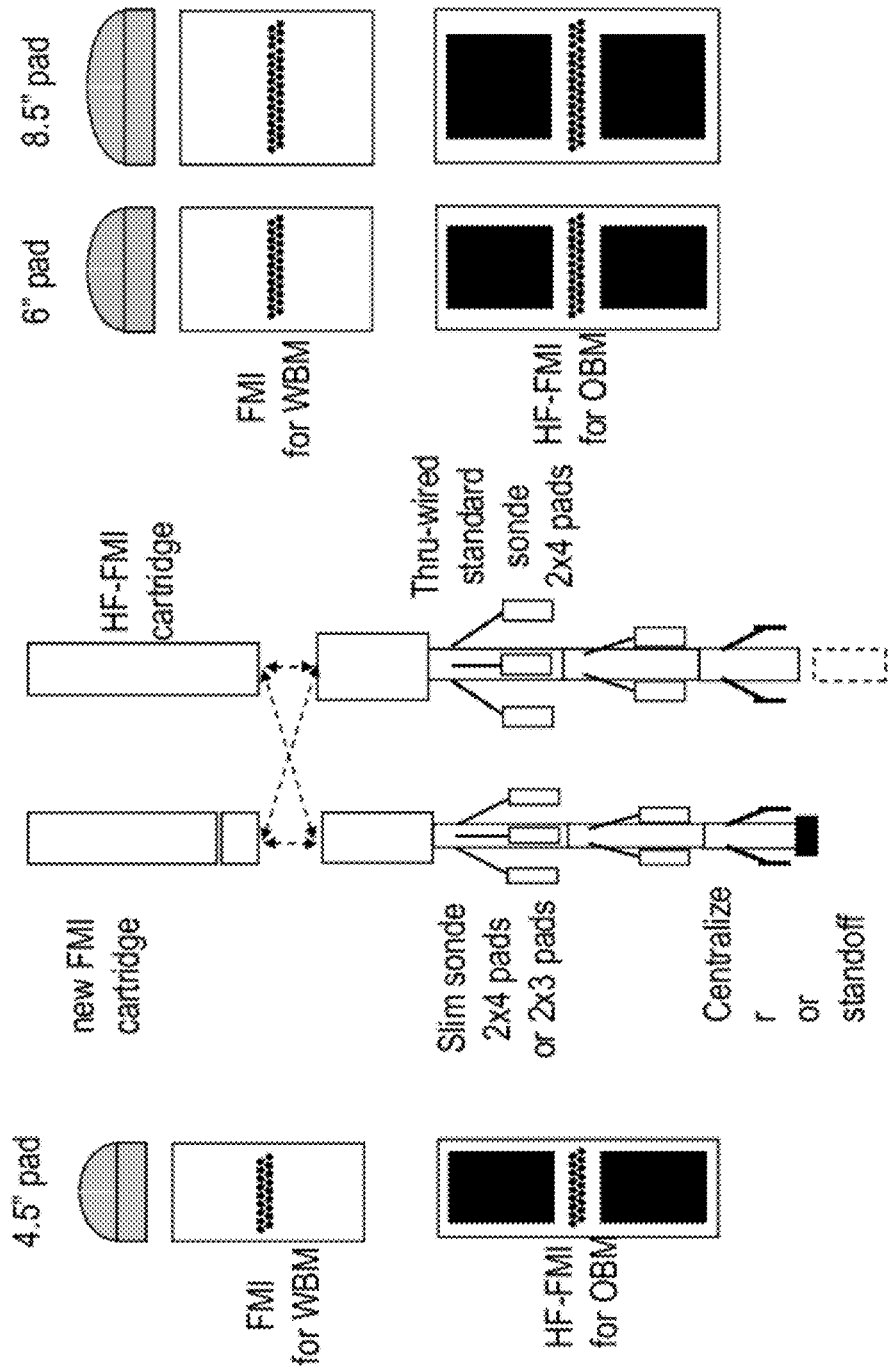

MODULAR APPARATUS AND METHOD FOR MAKING MEASUREMENTS IN BOREHOLES

TECHNICAL FIELD

This invention relates to a modular apparatus for making borehole measurements. It also relates to a method of making such measurements. The invention has particular application to the field of making measurements in oil and gas wells or the like.

BACKGROUND ART

In order to better understand the nature of underground formations surrounding a borehole, it is known to make measurements from within the borehole using tools suspended from the surface. One particular type of tool comprises a tool body or sonde having one or more extendable arms carrying sensor pads. In use, the arm or arms are extended until the pad is placed against the wall of the borehole, at which point measurements are made using the sensors on the pad. The tool can then be moved along the borehole (usually from bottom to top), dragging the pad across the borehole wall and allowing multiple measurements to be made along the length of the borehole.

One example of a tool of the type described above is the FMI tool of Schlumberger which comprises a sonde with four arms arranged in a radial array, each arm carrying a sensor pad with an array of button electrodes for making micro-resistivity measurements using the current injection principle. Details of the use and operation of such a tool can be found in U.S. Pat. No. 4,567,759. U.S. Pat. No. 6,191,588 describes a similar tool (OBMI tool of Schlumberger) for making measurements in boreholes containing non-conductive fluids using the 4-terminal principle. U.S. Pat. No. 7,066,282 describes other tools for making measurements in boreholes containing non-conductive fluids using the high-frequency current injection principle. Other forms of pad measurement are also known, such as micro-sonic and nuclear measurements for density determination.

One problem with pad tools of the type described above is that several different tools are needed to cover all eventualities of tool geometry and measurement technology. In some cases, these may only be used occasionally. It is an object of the invention to provide a tool structure that allows the re-use of common tool components as much as possible. It has been proposed previously to adopt a modular approach to borehole tool design. Examples can be found in GB2424665 and US2004/0251048.

This invention is based on the understanding that providing particular functionality only in the sensor pads and an electronics cartridge allows much of the tool structure to be common to a number of measurement types of tool configurations.

DISCLOSURE OF THE INVENTION

A first aspect of this invention provides apparatus for making measurements in boreholes comprising a sonde having a radial array of arms provided thereon; wherein
the sonde is connectable to a cartridge containing electronic circuitry specific to a predetermined measurement to be made in the borehole;
each arm is connectable to a sensor pad specific to the predetermined measurement; and
the sonde provides electrical connectivity between the sensor pads and the cartridge that is substantially independent of the predetermined measurement.

By providing such electrical connectivity that is substantially independent of the predetermined measurement, this allows the sonde to be connectable to a cartridge containing electronic circuitry that is common to more than one type of measurement.

The sensor pads typically comprise a base portion and a face portion, the face portion being selected from a series of face portions of different sizes according to the diameter of the borehole in which measurements are to be made. The base portion can be separate and selected from a series of base portions of different widths. It is preferred that the base portion comprises a common electronics board specific to the predetermined measurement irrespective of the size of the face portion or width of the base portion.

A common cartridge specific to the predetermined measurement is preferably provided, irrespective of the size of the face portion or width of the base portion.

In one embodiment of the invention, two arrays of arms are provided, the arrays being axially spaced apart on the sonde. The arms in each array are typically arranged so that pads on one array measure parts of the borehole that are not measured by pads on the other array.

The predetermined measurement can comprise a resistivity, microsonic, high-frequency electromagnetic propagation or nuclear density measurement.

The apparatus typically comprises three or four arms in each array.

The arms are preferably operable to move between a closed position in which the arms lie close to the sonde, and an open position in which the arms extend away from the sonde and hold the pads close to the wall of the borehole in use. The arms may also be operable to centralise the sonde in the borehole in use. The apparatus may further comprise a separate centralises or standoff that is operable to centralise the sonde in the borehole in use.

A second aspect of this invention provides a method of making measurements in a borehole, comprising:
providing a sonde having a radial array of arms provided thereon;
connecting the sonde to a cartridge containing electronic circuitry specific to a predetermined measurement to be made in the borehole;
connecting a sensor pad specific to the predetermined measurement to each arm, the sonde providing electrical connectivity between the sensor pads and the cartridge that is substantially independent of the predetermined measurement;
positioning the sonde in the borehole; and
operating the sonde so as to make the predetermined measurement.

Preferably, the method is performed using an apparatus according to the first aspect of the invention.

Further aspects of the invention will be apparent from the following description.

BRIEF DESCRIPTION OF THE DRAWINGS

FIGS. 3a-c, 4a-c and 5a-c show different aspects of measurement pads for use in embodiments of the invention;

FIGS. 6a and b show two different pad configurations;

FIGS. 7a-c and 8a-c show variations of pad design using a common base;

FIGS. 9a-c show variations of pad design using a common electronics board;

FIG. 10 shows the embodiment of FIG. 1 in use; and

FIG. 11 shows an alternative embodiment to that of FIGS. 3 to 5 using a double return pad configuration.

MODE(S) FOR CARRYING OUT THE INVENTION

Figure 2:
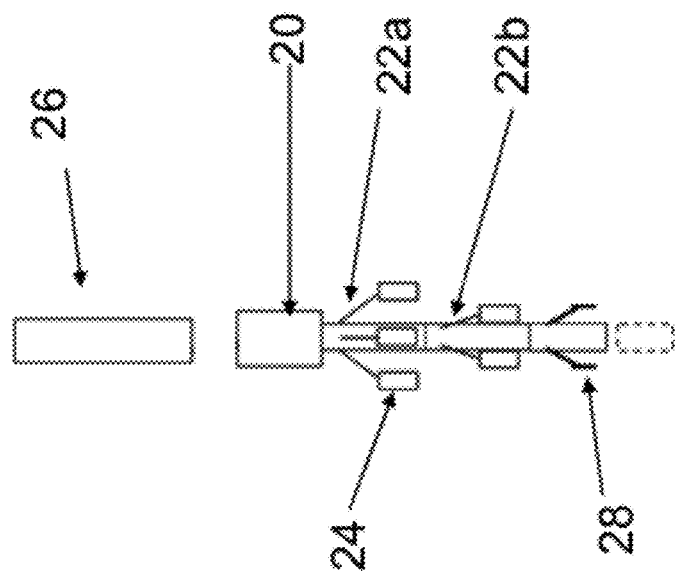
FIGS. 1 and 2 show basic configurations of a tool according to embodiments of the invention.
Figure 1:
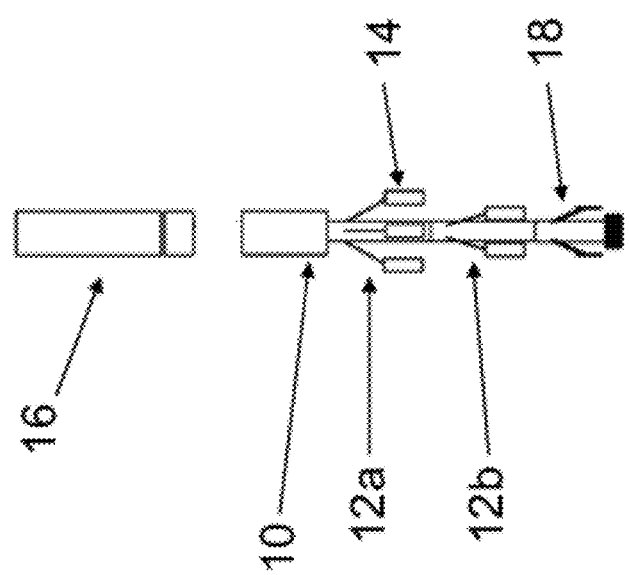

FIGS. 1 and 2 show schematic configurations of tools according to embodiments of the invention. FIG. 1 shows a tool for use in smaller borehole diameters, such as 4.5-8.5 inches (114-216 mm). This slim tool comprises a slim sonde body 10 having two sets of arms 12a, 12b (eight arms in two sets of four) located spaced apart in the axial direction on the sonde 10. Each arm is provided with a connection for a measurement pad 14. An electronics cartridge 16 specific to the particular measurement technology of the pads 14 is positioned at the top of the sonde 10 and a centraliser or standoff 18 is positioned at the bottom of the sonde 10. The sonde is -wired to provide electrical connection between the cartridge 16 and pads 14 which carry all of the functional electronic components for the particular type of measurement. The sonde is therefore substantially independent of the specific measurement technology used and can be used with differing cartridges and pads.

In use, the arms 12 can be either closed (as shown in set 12b) to provide a relatively small outer diameter for the tool so that it can be run into or out of the borehole; or open (as shown in set 12a) where the pads 14 can be placed against the borehole wall. The sonde 10 contains the necessary mechanism for opening and closing the arms 12.

FIG. 2 shows the corresponding configuration of a tool for use in larger borehole diameters, such as 6-16 inches (150-406 mm). The corresponding parts are given reference numerals in the range 20-28. The main differences are the diameter of the sonde 20 and the length of the arms, these dimensions being selected to allow proper contact of the pads 24 on the borehole wall at the larger hole diameters.

In an alternative configuration, particularly for the slim tool of FIG. 1, the sets of arms 12a, 12b might comprise six arms in two sets of three. In this case, the size of the pads 14 might have to be selected accordingly.

FIGS. 3a-3c, 4a-c and 5a-c show a range of measurement pads for a micro-resistivity measurement (FMI-type measurement). The pads have three different widths: narrow, (FIGS. 3a, 4a, 5a); medium (FIGS. 3b, 4b, 5b); and large (FIGS. 3c, 4c, 5c). FIGS. 3a-3c show the cross section of the pads. As can be seen, as well as the different widths of the pad bases 30a, 30b, 30c, the front faces 32a, 32b, 32c have different curvatures in order to accommodate the different curvatures of the various borehole diameters that might be encountered across the full range of hole sizes. The three widths would typically have curvatures to match boreholes of diameter 4.5 inch, 6 inch and 8.5 inch. FIGS. 4a-4c show the front faces of the pads for making an FMI-type measurement, each pad face 32 carrying an array of button electrodes 34 extending laterally across the face 32. While the width of each pad is different the length remains the same. FIGS. 5a-5c show corresponding pad designs for high-frequency current-injection type measurements for use in boreholes with oil-based drilling mud. In this case, a different electrode array 35 is used and the pads are longer than those shown in FIGS. 4a-4c.

The number and width of pads used can be selected according to the size of borehole to be measured. For example, a slim sonde (FIG. 1) with a three-arm configuration might use three medium-width pads 60 (FIGS. 3b, 4b, 5b) as is shown in FIG. 6a, rather than a four arm configuration with narrow-width pads (FIGS. 3a, 4a, 4c). FIG. 6b shows the corresponding four-arm configuration with 6 inch pads 62 that can be used on a standard sonde (FIG. 2).

One option for pad construction is to use a common base portion with different front faces for different hole sizes. FIGS. 7a-c and 8a-c show embodiments of this. FIGS. 7a-c show a common narrow base 70 with different front face parts 72a, 72b and 72c for narrow, medium and wide pads respectively. FIGS. 8a-c show embodiments based on a medium width base 80. In this case, the pad face of the first option 82a has the same curvature as the narrow front face of FIG. 7a. This is the configuration that may be best used in the arrangement of FIG. 6b. The curvatures on the faces 82b, 82c in FIGS. 8b and 8c correspond to the medium and wide examples shown in FIGS. 7b and 7c. The advantage of this approach is that only one or two pad base chassis are needed for all hole sizes, simplifying manufacturing and replacement.

FIGS. 9a-c show another option which is to use a common electronics board, irrespective of the base size or front face size. Thus, in FIG. 9, the bases 90a-c and front faces 92a-c are each dimensioned according to the hole size to be addressed. However, each base includes the same electronics board 94 for making the measurements.

FIG. 10 shows the embodiment of FIG. 1 in use. In this case, the tool 100 lowered into a borehole 102 by means of a wireline cable 104 which provides both mechanical support and power and data communication between the tool and the surface. When the tool reaches an appropriate depth, the arms 12 are opened until the pads 14 engage the wall of the borehole 102. In this case, only the first, top set of arms 12a is opened. Once both sets of arms are opened, the centraliser 18 may also be deployed to ensure that the sonde is maintained in the centre of the borehole irrespective of the individual movements of the arms 12. Once the arms are deployed, the tool 100 is logged up the well, the pads 14 making measurements as the tool is moved. The measurements can then be processed to derive an image of the property being measured at the borehole wall.

A modular imager tool provided by the invention can comprise:
1. A standard sonde (6 to 16 in. hole diameter) with eight independent or semi-independent arms in two sets of four. [Through wiring is not an essential feature]
2. A slim sonde (4.5 to 8.5 in. hole diameter) with eight arms in two sets of four
3. Two types of measurement pads for water-base (conductive) mud and oil-based (non-conductive mud, based on the current injection (FMI) and high-frequency current injection principles respectively.
4. Three pad curvatures and associated widths adapted for the common hole sizes (4.5, 6 and 8.5 in.) and designed to give 100% coverage in 6 and 8.5 inch holes:
   a. Narrow 2.25 in. radius pad
   b. Medium 3 in. radius pad
   c. Wide 4.25 in. radius pad
5. Two electronic cartridges for the current injection (FMI) and high-frequency current injection measurements respectively. Preferably, a single cartridge compatible with both measurements is provided.

The sonde is preferably approximately centralized using passive standoffs but can also be centralized either by an external centralizer or centralizers or by pad pressure on the upper set of four arms.

As well as the high-frequency current injection measurement discussed above, the 4-terminal measurement technique of Schlumberger's Oil-Based Mud Imager (OBMI) can also be used in oil-based mud.

Pads can be based on other physical principles, such as micro-sonic, high-frequency electromagnetic propagation or nuclear density.

The tool according to the invention can have the following forms of modularity:

a. The pads can be interchanged to function in different sizes of borehole and to make different types of measurements, for example electrical measurements in water-based or oil-based mud, and ultrasonic or nuclear measurements.

b. Different sizes of pad and sonde can be connected to the same electronic cartridge.

c. Different types of measurement may be made using the same electronic cartridge, or specific cartridges may be provided for certain types of measurement.

There are various possible ways of increasing the degree of modularity to reduce the number of electronics boards and pad bases, such as:

a. Using the 6 inch pads with 4.5 in. radius front faces in two sets of three on the slim sonde (FIG. 6*a*).

b. Using a single pad base and electronics card with two or three front faces (FIGS. 7 and 8).

c. Using a single electronics board with three bases and front faces (FIG. 9).

The last two options may be more difficult for measurements where preamplifiers must be located close to the sensors on the pad.

The invention claimed is:

1. An apparatus comprising:
    a sonde
    connectable to a cartridge containing electronic circuitry specific to a predetermined measurement to be made in a borehole; and
    a plurality of arms connected to the sonde and arranged in a radial array about the sonde, wherein each arm is connectable to a sensor pad configured to measure the predetermined measurement;
    wherein the sonde is configured to provide electrical connectivity between each sensor pad and the cartridge, and wherein the electrical connectivity is substantially independent of characteristics of the sensor pad.

2. The apparatus claimed in claim 1, wherein each arm is connectable to any of a plurality of sensor pads, each having a face portion having a different size.

3. The apparatus claimed in claim 1, wherein each arm is connectable to any of the plurality of a plurality of sensor pads, each having a base portion having a different width.

4. The apparatus claimed in claim 2, wherein the base portion of each of the plurality of sensor pads comprises a common electronics board specific to the predetermined measurement irrespective of the size of a face portion of the each sensor pad or the width of the base portion on each sensor pad, wherein the face portion is substantially opposite from the base portion on each sensor pad.

5. The apparatus claimed in claim 1, where the sonde is connectable to a common cartridge specific to the predetermined measurement; irrespective of the characteristics of the sensor pad.

6. The apparatus claimed in claim 1, wherein the plurality of arms is arranged into a second array of arms, the second array being axially spaced apart from the first array with respect to a length of the sonde.

7. The apparatus claimed in claim 6, wherein the arms in each of the first and second array are arranged so that the sensor pads on the first array measure a different portion of the borehole from the sensor pads on the second array.

8. The apparatus claimed in claim 6, wherein each of the first and second array comprises three or four arms.

9. The apparatus claimed in claim 1, wherein the predetermined measurement comprises a resistivity, microsonic, high-frequency electromagnetic propagation or nuclear density measurement.

10. The apparatus claimed in claim 1, wherein the arms are operable to move between a closed position in which the arms lie close to the sonde, and an open position in which the arms extend away from the sonde and hold the sensor pads close to a wall of the borehole while the apparatus is in operation.

11. The apparatus claimed in claim 10, wherein the arms are operable to substantially centralize the sonde in the borehole while the apparatus is in operation.

12. The apparatus claimed in claim 1, further comprising a centraliser or standoff that is operable to substantially centralize the sonde in the borehole while the apparatus is in operation.

13. A method, comprising:
    providing a sonde having a radial array of arms;
    connecting the sonde to a first cartridge containing electronic circuitry configured to measure a first predetermined measurement;
    connecting a first sensor pad to each arm, wherein each first sensor pad is configured to measure the first predetermined measurement;
    positioning the sonde in the borehole; and
    operating the sonde to provide an electrical connection between the first sensor pads and the first cartridge to make the first predetermined measurement, wherein the electrical connection is substantially independent of a characteristic of the first sensor pads.

14. The method of claim 13 when performed using an apparatus as claimed in claim 1.

15. The method of claim 13, comprising:
    connecting the sonde to a second cartridge containing electronic circuitry configured to measure a second predetermined measurement;
    connecting a second sensor pad to each arm, wherein each second sensor pad is configured to measure the second predetermined measurement; and
    operating the sonde to provide an electrical connection between the second sensor pads and the second cartridge to make the second predetermined measurement, wherein the electrical connection is substantially independent of a characteristic of the second sensor pads.

16. The method of claim 13, wherein operating the sonde to provide the electrical connection between the first sensor pads and the first cartridge comprises operating the sonde such that the electrical connection is substantially independent of a type of measurement of the first predetermined measurement measured by the first sensor pads.

17. The method of claim 13, wherein operating the sonde to provide the electrical connection between the first sensor pads and the first cartridge comprises operating the sonde such that the electrical connection is substantially independent of a dimension of the first sensor pads.

18. The method of claim 13, wherein operating the sonde to provide the electrical connection between the first sensor pads and the first cartridge comprises operating the sonde such that the electrical connection is substantially independent of a type of mud used in the borehole.

19. The method of claim 13, wherein operating the sonde to provide the electrical connection between the first sensor pads and the first cartridge comprises operating the sonde such that the electrical connection is substantially independent of both a characteristic of the first sensor pads and a characteristic of the cartridge.

20. The method of claim 19, wherein operating the sonde to provide the electrical connection between the first sensor pads and the first cartridge comprises operating the sonde such that the electrical connection is substantially independent of the electronic circuitry of the cartridge.

\* \* \* \* \*

UNITED STATES PATENT AND TRADEMARK OFFICE
CERTIFICATE OF CORRECTION

| | | |
|---|---|---|
| PATENT NO. | : 8,925,378 B2 | Page 1 of 1 |
| APPLICATION NO. | : 13/121231 | |
| DATED | : January 6, 2015 | |
| INVENTOR(S) | : Charles Durbec et al. | |

It is certified that error appears in the above-identified patent and that said Letters Patent is hereby corrected as shown below:

On the Title Page, Item (75)

The second inventor's first name was mis-spelled.

Correct: Ollivier

Incorrect: Olivier

Signed and Sealed this
Fourteenth Day of April, 2015

Michelle K. Lee
*Director of the United States Patent and Trademark Office*